United States Patent [19]

French et al.

[11] Patent Number: 4,629,955
[45] Date of Patent: Dec. 16, 1986

[54] METHOD AND APPARATUS FOR MACHINE CONTROL

[76] Inventors: Daniel B. French, 10130 Duncan Dr., Florence, Ky. 41042; Michael A. Steinmetz, 655 Wilfert Dr., Cincinnati, Ohio 45245

[21] Appl. No.: 772,292

[22] Filed: Sep. 4, 1985

[51] Int. Cl.⁴ ............................................. G05B 11/32
[52] U.S. Cl. ..................................... 318/625; 364/474
[58] Field of Search ........................... 318/625, 85, 78; 364/474

[56] References Cited

U.S. PATENT DOCUMENTS

3,845,284  10/1974  Taguchi et al. ...................... 318/625

Primary Examiner—William M. Shoop, Jr.
Assistant Examiner—Saul M. Bergmann

[57] ABSTRACT

A method and apparatus for controlling a split axis servo mechanism are provided. Each of the two servo mechanisms is responsive to a single machine member motion command for effecting linear motion of a machine gantry. Velocity skewing of the servo mechanisms is corrected by modifying the gain of one of the servo mechanisms in response to the difference between the actual positions of both. The gain modification effects reduction of the magnitude of the actual position difference.

9 Claims, 8 Drawing Figures

METHOD AND APPARATUS FOR MACHINE
CONTROL

BACKGROUND OF THE INVENTION

This invention relates generally to machine control. In particular, this invention relates to control of linear motion of a single rigid machine member driven by two independent servo mechanisms.

Machines incorporating gantry structures have been traditionally used for milling and drilling large components with extreme precision. In recent years gantry structures have been adopted for use in program controlled robots and manipulators for material handling between multiple machines and for large workpiece processing. Propulsion of a gantry is effected at supporting ends and to achieve the desired linear motion of the gantry relative to the machine frame without skew of the ends, it is necessary to drive the gantry ends at the same velocity. A degree of velocity matching may be achieved mechanically using a single driving motor and a drive shaft connecting the propulsion elements at the gantry ends. Such mechanical approaches are, nevertheless, subject to skewing caused by twisting and bending of the drive shaft. It is preferable to provide separate driving motors and transmissions for each gantry end. Servo mechanism control of the driving motors assures velocity matching within the tolerances of load matching at the motors and the servo mechanism control components. The linear motion of the gantry is controlled by a single motion axis command which is applied simultaneously to both servo mechanisms. This type of control shall be referred to herein as split axis control. Split axis control is susceptible to skewing between the drives attributable to differences in load or unmatched variations in servo mechanism components. Heretofore, such skewing has been accommodated by monitoring servo mechanism feedback signals and reducing velocity or stopping motion when the skew becomes excessive.

SUMMARY OF THE INVENTION

It is an object of the present invention to provide split axis servo mechanism control of linear motion of a rigid machine member, the control having dynamic compensation for skewing caused by a difference in velocity achieved by the two servo mechanisms.

It is a further object of the present invention to provide split axis servo mechanism control of linear motion of a machine gantry structure, the control using servo mechanism position feedback to effect dynamic compensation for skewing caused by different velocities achieved by the two servo mechanisms.

It is a still further object of the present invention to provide split axis servo mechanism control of linear motion of a machine gantry structure, wherein signal processing of the individual servo mechanisms is performed sequentially and the control provides dynamic compensation for velocity skewing produced by the servo mechanisms.

Further objects and advantages of the present invention shall be made apparent from the accompanying drawings and the description thereof.

In accordance with the aforesaid objects, a method and apparatus for split axis servo mechanism control of linear motion of a rigid machine member are provided. Position feedback signals representing actual positions of each of two driving means are periodically sampled during motion of the machine member. An actual position difference signal is produced representing the difference of actual positions. A servo mechanism gain modification signal is produced in response to the actual position difference signal. The gain of a selected one of the servo mechanisms is modified in response to the gain modification signal to effect reduction of the magnitude of the actual position difference signal.

DESCRIPTION OF THE PREFERRED EMBODIMENT

To illustrate the present invention, a program controlled robot incorporating a gantry structure together with the control therefore shall be described in detail. The robot and control combination to be described are available from Cincinnati Milacron Inc., the assignee of the present invention. It is to be understood that the applicability of the present invention is not limited to robots or other program controlled manipulators, but is suitable for use with any machine incorporating a gantry structure.

Figure 1:
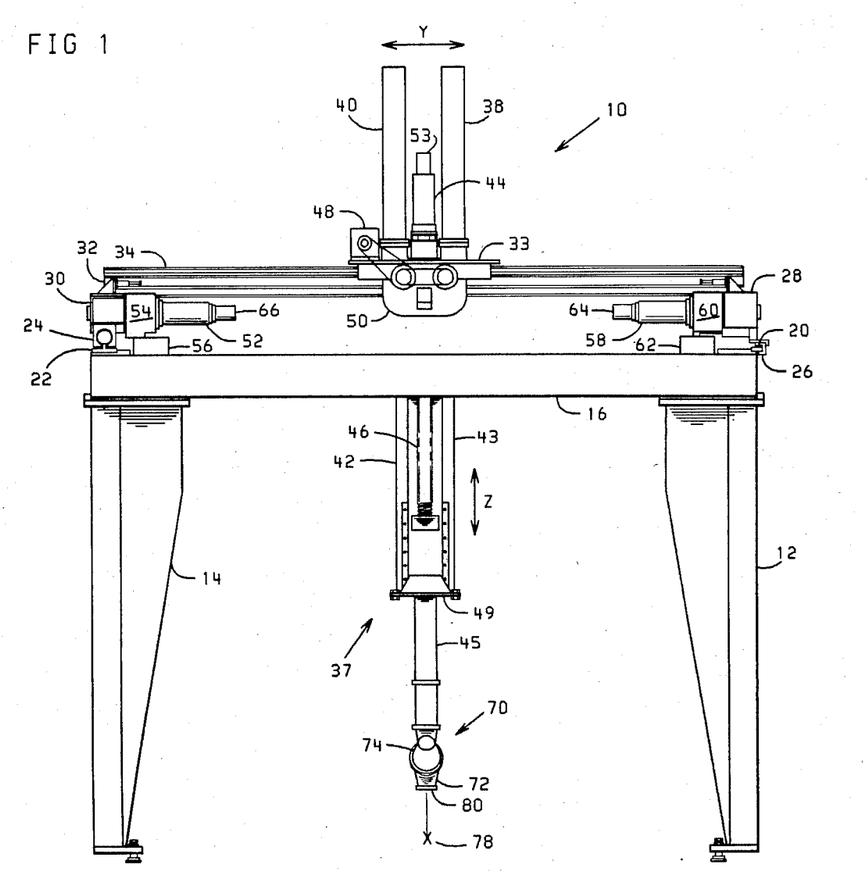
FIG. 1 is an end view of a robot having a gantry structure.
Figure 2:
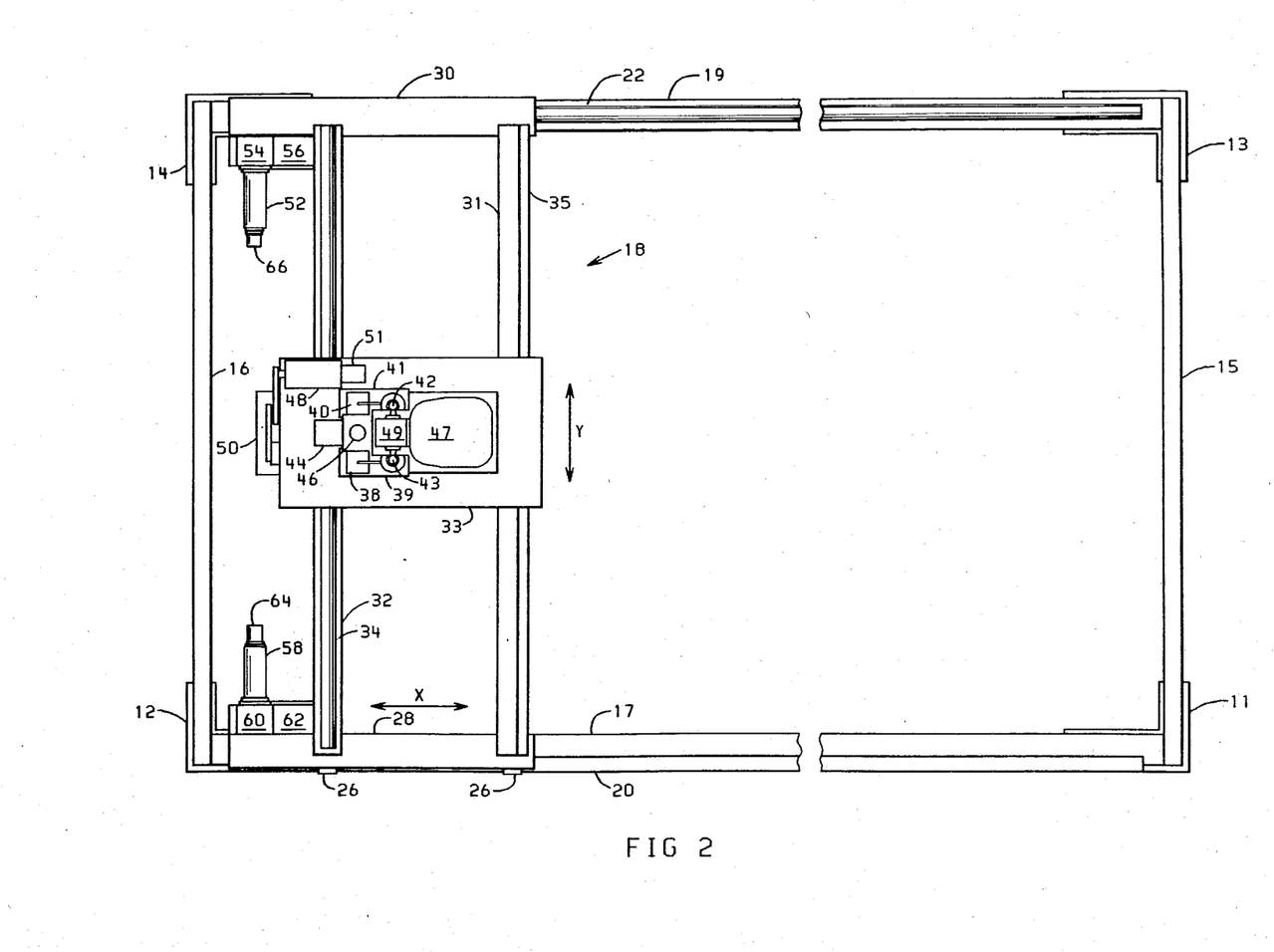
FIG. 2 is a top view of the robot of FIG. 1 showing the motion axis of the gantry structure.

The robot and gantry structure shall be described with reference to FIGS. 1 and 2. The robot 10 includes a base having a frame defined by end members 15 and 16 and side members 17 and 19. The frame is supported by legs 11, 12, 13 and 14. A gantry 18 is supported on the frame by slides 26 slidably supported on rectangular way 20 and by a slide 24 slidably supported on cylindrical way 22. Motion of the gantry relative to the robot frame defines the X axis of motion of the machine.

The gantry 18 includes a frame made up of cross members 31 and 32 and end pieces 28 and 30. The slides 26 are rigidly affixed to end piece 28 and slide 24 is rigidly affixed to end piece 30. A carriage 33 is movably supported upon cross members 31 and 32 by slides (not shown) movably supported upon rectangular way 35 and cylindrical way 34. The motion of the carriage relative to the gantry frame along the ways 35 and 34 is defined as the Y axis of motion.

The carrier 33 provides support for an arm 37 including an upper arm 49 and a lower arm 45. Circular ways 42 and 43 are movably supported within guides 41 and 39 rigidly affixed to carriage 33. Motion of the arm 37 relative to carriage 33 defines the Z axis of motion of the robot. Specification of coordinates of the X, Y, and Z axes defines a location of a workpoint 78 associated with a tool carried by lower arm 45.

At the lower end of lower arm 45 a wrist 70 provides an additional 3 axes of motion. Inner wrist half 74 rotates relative to lower arm 45 about a vertical axis centered within lower arm 45. Outer wrist half 72 rotates relative to inner wrist half 74 about an axis oblique to the axis of rotation of inner wrist half 74. Face plate 80 rotates about an axis through the center of face plate 80 and perpendicular thereto. These three rotations control the orientation of a tool attached to face plate 80. Orientations are described by the Euler angles D, E and R. The relationship of these angles to the axes of rotation of the wrist shall be described in greater detail subsequently.

The gantry is propelled bidirectionally in the X axis by driving motors 52 and 58. Each motor respectively imparts rotation to a drive gear (not shown) engaging a rack (not shown) rigidly affixed to the robot frame. The motor 52 effects rotation of the associated driving gear through transmission 54 and gear train 56. Position feedback for motor 52 is provided by position transducer 66, a resolver. Drive motor 58 effects rotation of its associated driving gear through transmission 60 and gear train 62. Position feedback for drive motor 58 is provided by transducer 64. The motors 52 and 58 are independently controlled by servo mechanism circuits responding to a single X axis command. The motor 58 and its associated servo mechanism circuit are designated as the X servo mechanism and the motor 52 and its associated servo mechanism circuit are designated as the X' servo mechanism. Each servomechanism circuit produces an error signal for a motor drive amplifier by comparing the actual position signal produced by the resolver to a position command signal.

Motion of carriage 33 relative to gantry 18 is effected by drive motor 48 imparting rotation to a drive gear (not shown) through gear box 50. The drive gear engages a rack (not shown) rigidly affixed to cross member 32. The position of the carriage in the Y axis is measured by position transducer 51 affixed to drive motor 48.

Motion of the arm 37 is achieved by rotation of a drive nut (not shown) by drive motor 44. The drive nut engages drive screw 46 and effects reciprocation thereof. The arm position is measured by position transducer 53 affixed to drive motor 44. In addition to drive motor 44 pneumatic counter balances 38 and 40 are provided to equalize the load presented to drive motor 44 between the up and down directions.

Figure 3A:
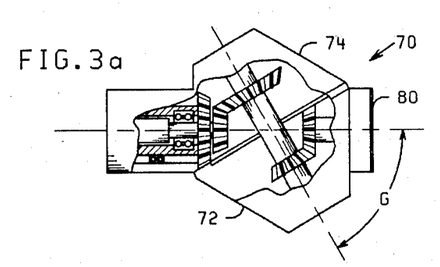
FIGS. 3a and 3b are diagrams of the wrist of the robot shown in FIG. 1 together with the axes of motion of the wrist.

In FIG. 3a details of construction of wrist 70 are revealed by the cut-away view of inner wrist segment 74 and outer wrist segment 72. Rotations of the inner wrist segment 74, the outer wrist segment 72, and the face plate 80 are effected by concentric transmission tubes within the interior of lower arm 45. The rotation of these transmission tubes is imparted by drive motors (not shown) affixed to transmission 47 at the upper end of lower arm 45. The axis of rotation of the outer wrist half 72 relative to inner wrist half 74 is inclined at an angle G to the axis of rotation of inner wrist half 74.

Figure 3B:
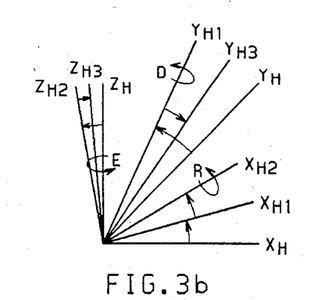

FIG. 3b illustrates the definition of the orientation angles D, E, and R with respect to a rectangular coordinate system having its origin at a workpoint 78 associated with the tool attached to faceplate 80. The axes of this coordinate system ($X_h$, $Y_h$, $Z_h$) are parallel to the X, Y, and Z axes defined by the gantry 18, carrier 33, and arm 37. The Euler angles D, E and R define rotations relative to the hand coordinate system as follows:

(1) E is the magnitude of rotation about $Z_h$ to align $X_h$ and $Y_h$ with $X_{h1}$ and $Y_{h1}$ respectively.

(2) D is the magnitude of rotation about $Y_{h1}$ to align $X_{h1}$ with $X_{h2}$ and $Z_h$ with $Z_{h2}$.

(3) R is the magnitude of rotation about $X_{h2}$ to align $Y_{h1}$ with $Y_{h3}$ and $Z_{h2}$ with $Z_{h3}$.

While the location of tool centerpoint 78 is defined by the coordinate axes X, Y, and Z, the orientation of a tool relative to the tool centerpoint is defined by the orientation angles D, E and R.

Figure 4:
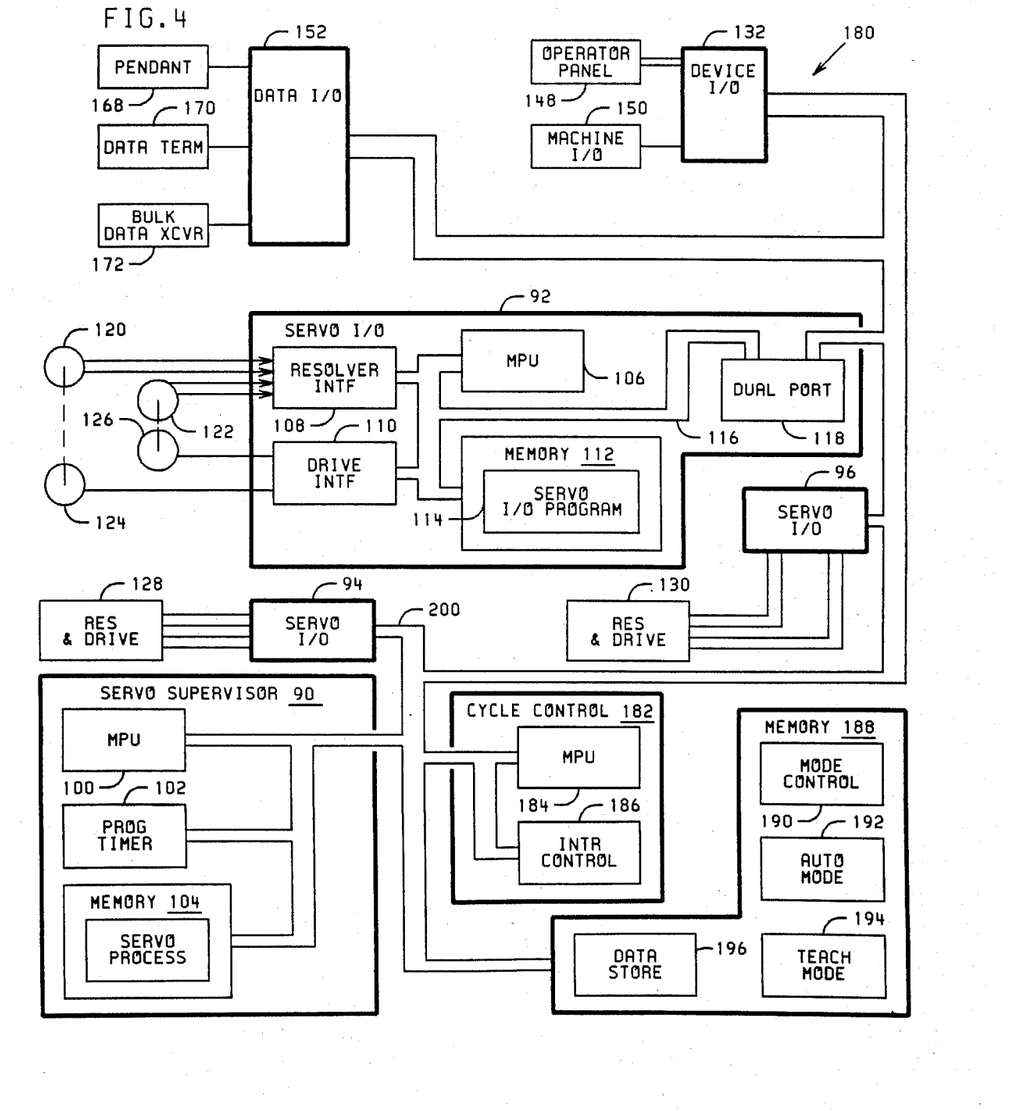
FIG. 4 is a block diagram of the control for the robot shown in FIGS. 1 and 2.

Motion of the machine members of robot 10 is directed by the control 180 illustrated by the block diagram of FIG. 4. The control 180 includes a plurality of independent modules including the cycle control 182, the servo supervisor 90, the servo input/output modules 92, 94, and 96, the device input/output module 132, and the data input/output module 152 connected by the common bus 200. Each of these modules typically includes a microprocessor and associated peripheral devices and memory as required for the function of the module. Applicants have chosen to implement these modules using the 8085 and 8086 family of microprocessors and peripheral devices available from Intel Corporation.

The overall cycle of operation of robot 10 is defined by a program stored within data store 196 and executed by cycle control 182 in response to the operating system programs 192 for the automatic mode of operation. The application program stored within data store 196 may be produced on independent equipment and loaded through the data input/output module 152 from a bulk data transceiver 172. Alternatively, the program may be created by teaching, that is, by positioning the tool centerpoint 78 at desired locations with the tool in the orientation desired at each location and recording location and orientation coordinates using pendent 168. This method of application program creation is effected by execution of the teach mode programs 194 contained within memory 188. The mode of operation of the control is determined by inputs received through the operator panel 148 connected to device input/output module 132 and the pendent 168 or data terminal 170 connected through the data input/output module 152. Mode control programs 190 associated with operating mode selections are stored within memory 188.

During execution of the application program, the control receives inputs from the machine and effects the actuation of discrete devices on the machine by an exchange of signals through the device input/output module 132 and the machine input/output interface 150. The microprocessor unit 184 of cycle control 182 executes the selected programs stored in memory 188 until processing is interrupted in response to interrupt request signals by means of the interrupt control 186. Interrupt request signals may be produced in response to machine activity or operator inputs sensed through the device input/output module 132 or through data input/output module 152.

To effect motion of the robot machine members, the cycle control 182 repetitively produces motion command signals which are used by the servo supervisor 90 to control the operation of the servo mechanism input/output interface modules 92, 94 and 96. The servo supervisor 90 includes a local microprocessor 100 executing servo processing programs stored within local memory 104 and a programmable timer 102 for producing an interrupt signal to periodically effect the interruption of program processing by cycle control 182. Motion command signals produced by cycle control 182 are distributed to the appropriate servo mechanism input/output interface module by servo supervisor 90 with each of the timed interrupt signals. Each of the servomechanism input/output interface modules provides the necessary interface circuitry for connection to two driving motors and their associated position transducers.

Further details of the servo mechanism interface modules are illustrated by the servo mechanism input/output interface module 92. Connection between the module 92 and the control bus 200 is achieved through the dual port memory device 118. Data to be exchanged between the module 92 and other modules within the system is transferred through the dual port memory device asynchronously. Local processor 106 executes the servo input/output programs 114 stored within local memory 112. The local processor receives position feedback signals from the position transducers 120 and 122 through the resolver interface circuitry 108. These signals are used in conjunction with position command signals received from the cycle control 182 to produce drive command signals which are transferred to drive amplifiers for the drive motors 124 and 126 by the drive interface 110. The drive command signals define the velocity of the driving motors and are produced from the position information in response to a gain signal associated with each servo mechanism. The gain signal relates the difference between commanded and actual position to velocity of the drive motors. It will be appreciated that with a single local microprocessor to control the receipt of position information and the transmission of drive information, the actual transfer of signals between the interface module 92 and the feedback transducers and drive motors for the two axes are separated or skewed slightly in time. As it is the object of the present invention to compensate for load dependent skewing between the X and X' drive motors, it is also necessary to provide for compensation for the time skewing introduced by the servo mechanism processing.

Figures 5A, 5B, 6:
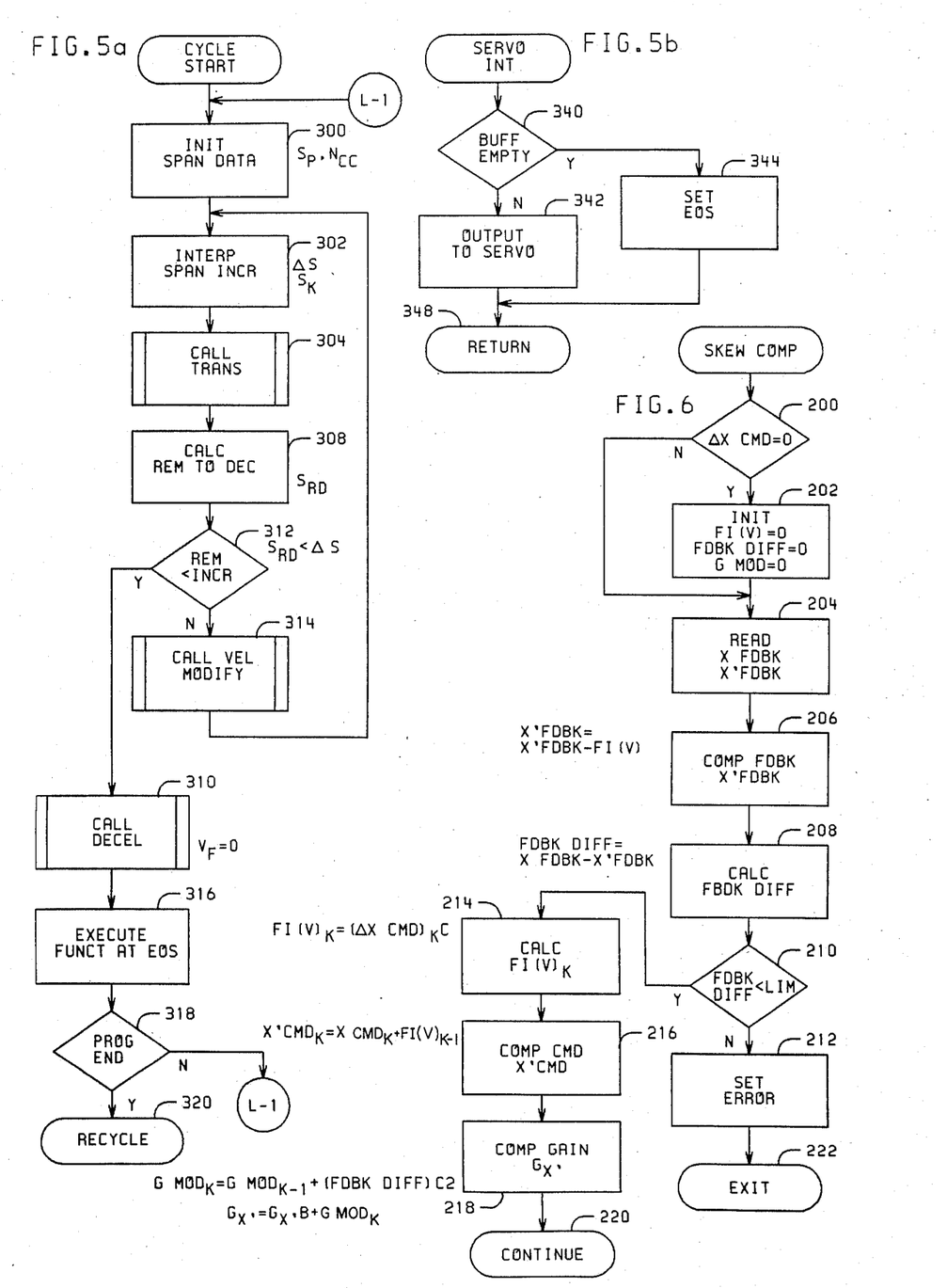
FIGS. 5a and 5b are flow charts of the main motion control procedures effected by the control of FIG. 4.
FIG. 6 is a flow chart of the procedure for controlling the servo mechanisms associated with the gantry structure the robot of FIGS. 1 and 2.

The control procedures for effecting motion of the machine members associated with the automode programs 192 shall be described with reference to the flow charts of FIGS. 5a and 5b. The flow chart of FIG. 5a illustrates the processing steps executed by the cycle control 182 to produce motion of the machine members in accordance with the application program defining locations and functions stored in the data store 196. The flow chart of FIG. 5b illustrates the processing steps executed by the servo supervisor 90 in processing motion command signals produced by the cycle control 182.

Processing of the procedural steps of the flow chart of FIG. 5a is initiated by the cycle start signal produced in response to the operation of a cycle start push button on operator panel 168. At process step 300 data are computed which are required for the interpolation of intermediate points along a linear path between two successive programmed locations of the tool centerpoint 78. Coordinate data of these programmed locations and a programmed velocity are recalled from memory and a span length signal $S_p$ and coordinate component ratio signals $N_{cc}$ are calculated. At process step 302 an increment $\Delta S$ along the span defined by the starting and ending locations is interpolated. The span increment represents the distance the tool centerpoint 78 will travel along the span during an iteration interval defined by the period of interrupt signals produced by the programmable timer 102. Prior to the onset of deceleration upon approach of the end of span, the procedure of increment interpolation effects acceleration from an initial velocity $V_I$ to a programmed velocity $V_P$ by incrementally increasing the value of an increment velocity $V_k$. The span increments are accumulated to produce a current span length signal $S_k$ for each iteration of the interpolation process.

At process step 304 execution of a subroutine is initiated to produce machine motion command signals in response to the accumulated distance signal $S_k$ and the coordinate component ratio signals $N_{cc}$. The subroutine resolves the current span length signal into the coordinate components for the six axes of motion X, Y, Z, D, E, and R. These coordinate components are then transformed to incremental distances of the machine members including the wrist members to place the tool centerpoint 78 at the location defined by the coordinates and to align the tool with the orientation defined by the Euler angles. The compensations required for time skewing and load dependent skewing affecting control of the X and X' axes are performed on the resulting machine motion command signals. The resulting machine motion command signals are loaded into a buffer store for access by the servo supervisor 90.

At process step 308 a value is computed for the distance which remains between the current location along the span and the location at which deceleration must begin prior to the end of span. This calculation requires the computation of the distance required to decelerate from the current velocity $V_k$ of the tool centerpoint to zero velocity using a predetermined rate of deceleration. At decision step 312 it is determined whether the last incremental distance $\Delta S$ is greater than the distance remaining to the starting location for the deceleration span. Provided the distance remaining $S_{rd}$ to the starting location of deceleration is greater than the incremental distance $\Delta S$, execution of the interpolation procedure continues at process step 314 where the incremental velocity $V_k$, may be modified in response to selected process related parameters. Thereafter the repeated iteration of the interpolation process continues through the loop comprised of process steps 302 through 314.

When it is determined at decision step 312 that the distance remaining $S_{rd}$ to the starting point of deceleration is less than the incremental distance $\Delta S$, execution of the motion control procedure continues at process step 310 where execution of a deceleration subroutine is initiated. The deceleration subroutine effects the orderly reduction of velocity from the current incremental velocity $V_k$ a final velocity $V_f$ of zero. The process of deceleration includes the interpolation of span increments $\Delta S$ using a progressively decreasing value of incremental velocity $V_k$. The production of machine motion command signals in response to the interpolation of these increments is accomplished by execution of the same subroutine associated with process step 304. Upon completion of the execution of the deceleration subroutine, execution of the motion control procedure continues at process step 316 where a program function associated with the end of the span is executed. Function commands may cause the operation of a tool or other machine device or may be associated with internal control operation related to a particular application process. At decision step 318 it is determined whether or not the location defining the end of the span corresponds to the end of the program stored in data store 196. If not, execution of the motion control procedure continues through the on page connector L1 to process step 300 to initialize data for the next programmed span. Execution of the stored program of motion continues in this fashion until it is determined at decision step 318 that the last location of the program has been reached. Thereafter, the entire program of stored locations is recycled by the automatic recycle of terminal 320.

The primary axis command signal processing of the servo supervisor 90 shall be described with reference to FIG. 5b. At decision step 340 it is determined whether or not the buffer in which the machine motion command signals are stored is empty. If the buffer is empty it is presumed that the end of span has been reached and process step 344 sets an end of span flag. If it is determined at decision step 340 that the command signal buffer is not empty, execution continues at process step 342 where sub-increments of the machine axes commands are output to the servo input/output interface modules. Each sub-increment is a portion of the motion command signal produced by the procedure of FIG. 5a.

The skew compensation procedure which is included within the transformation procedure executed as part of the subroutine associated with process step 304 shall be described with reference to the flow chart of FIG. 6. At decision step 200 it is determined whether or not the X axis command increment for the current iteration is other than zero. The skew compensation procedure requires initialization of values prior to effecting compensation during motion. Consequently, if the X axis command increment is zero, indicating a velocity of zero, the initialization procedure will be executed by process step 202. If the commanded velocity for the X axis is other than zero, process step 202 will be skipped. At process step 204 the actual position signals XFDBK and X'FDBK from the feedback transducers for the X and X' driving means are read from the servo input/output interface module. At process step 206 the X' actual position signal X'FDBK is compensated for the time skew associated with the time difference between processing the signals associated with the X and X' servomechanisms. The time skew correction value is computed as a function F1(V) of the velocity of the X axis and is calculated as part of the execution of the skew compensation procedure. At process step 208 the actual position difference signal FDBK DIFF representing the difference between the actual position signals for the X and X' driving motors is calculated. At decision step 210 it is determined whether the actual position difference signal FDBK DIFF is less than a predetermined limit value LIM. If the actual position difference signal FDBK DIFF is not less than the limit value LIM, an error flag is set by process step 212 and execution of the skew compensation procedure is exited at terminal 222.

Assuming that it is determined at decision step 210 that the actual position difference signal FDBK DIFF is less than the predetermined limit LIM, execution of the skew compensation procedure continues at process step 214. There, the skew correction value F1(V) used by process step 206 is computed using command data for the X driving motor. The X' correction value F1(V) is equal to the product of the X command increment and a constant of proportionality equal to the ratio of the magnitude of the time skew to the magnitude of the iteration interval time.

At process step 216 the X' driving motor command increment is corrected for the time skew associated with the output of the X and X' command signals through the servo mechanism input/ output interface by adding the correction value calculated at process step 214 to the X command value. At process step 218 load dependent skewing compensation is effected by computing a gain modification signal $GMOD_k$. The gain modification signal is equal to the sum of the previous value of the gain modification signal $GMOD_{k-1}$ and the product of the actual position difference signal FDBK DIFF calculated at process step 208 and a predetermined constant C2. The constant C2 is experimentally determined to relate the magnitude of the actual position difference to an increment of gain to effect a timely reduction of load dependent skew without introducing instability. The gain for the X' servo mechanism is modified by summing a base gain signal $G_{X'}B$ representing the base value of gain for the X' servo mechanism with the gain modification signal $GMOD_k$. Following execution of the load dependent skewing compensation calculations at process step 218 execution of the transformation procedure continues through terminal 220. With each execution of the computations of process step 218 while the X axis command is nonzero, the gain $G_{X'}$ of the X' servo mechanism is modified by an amount which has the effect of reducing the magnitude of the actual position difference signal. This reduction causes the magnitude of the gain modification signal $GMOD_k$ in subsequent iterations to asymptotically approach a steady state value to eliminate load dependent skewing at a constant velocity.

It will now be apparent that as a consequence of the time skew associated with the processing of signals for the X and X' servomechanisms, the skew compensation procedure includes processing steps for correcting the apparent values of actual position signals used in the calculations for compensating for load dependent skewing. Were it not for the time skew inherent in the operation of the servo mechanism input/output interface modules chosen by applicants, the load dependent skewing compensation would be effected simply by execution of the calculations associated with process steps 208, 210 and 218.

While the present invention has been illustrated by description of the preferred embodiment and while the preferred embodiment has been described in considerable detail, it is not the intention of the applicants to restrict or in any way limit the scope of the appended claims to such detail. Rather, it is the intention of applicants, that the invention be accorded the full scope of all equivalents, modifications and alterations to the definition found in the appended claims.

What is claimed is:

1. A method for controlling two servo mechanisms associated with driving means for effecting parallel motion of distal ends of a rigid machine member, the machine member motion being defined relative to a single axis of motion of the machine and being effected in response to a machine member motion command signal, each servo mechanism responding to a gain signal, a command signal, and an actual position signal to produce a drive command signal for controlling the velocity of the driving means, the method comprising the steps of:

(a) periodically producing an actual position signal for each servo mechanism representing the actual position of the associated driving means relative to the axis of motion of the machine member;

(b) producing an actual position difference signal in response to the actual position signals of both servo mechanisms, the actual position difference signal representing the difference between the actual positions of the driving means; and (c) producing a modified gain signal in response to the actual position difference signal, the modified gain signal representing a gain value of a selected servo mechanism required to reduce the magnitude of the actual position difference signal.

2. The method of claim 1 wherein the steps are repetitively executed and the step of producing a modified gain signal further comprises the steps of:

(a) producing a gain modification signal in response to the actual position difference signal, the gain modification signal representing a magnitude of gain required to reduce the magnitude of the actual position difference signal; and (b) adding the gain modification signal to a base gain signal representing a base value of gain for the selected servo mechanism to produce the modified gain signal.

3. A method for controlling two servo mechanisms associated with driving means for effecting parallel motion of distal ends of a rigid machine member, the machine member motion being defined relative to a single axis of motion of the machine and being effected in response to the machine motion command signal, each servo mechanism responding to a gain signal, a command signal, and an actual position signal to produce a drive command signal for controlling the velocity of the associated driving means, the method comprising the steps of:

(a) periodically producing an actual position signal for each servo mechanism representing the position of the associated driving means relative to the axis of motion of the machine member;

(b) periodically and successively producing a drive command signal for each servo mechanism in response to the actual position signal and the motion command signal;

(c) producing an actual position difference signal in response to the actual position signals of both servo mechanisms, the actual position difference signal representing the difference between the actual positions of the driving means; and (d) producing a modified gain signal in response to the actual position difference signal, the modified gain signal representing a servo mechanism gain for a selected servo mechanism which will effect the reduction in magnitude of the actual position difference signal.

4. The method of claim 3 wherein the steps of producing the actual position difference signal further comprises the steps of:

(a) scaling the command signal of the nonselected servo mechanism by a constant of proportionality;

(b) subtracting the scaled command signal from the actual position signal of the selected servo mechanism; and (c) subtracting the difference of the actual position signal and the scaled command signal from the actual position signal of the nonselected servo mechanism to produce the actual position difference signal.

5. The method of claim 4 wherein the step of producing a modified gain signal further comprises the steps of:

(a) producing a gain modification signal in response to the actual position difference signal, the gain modification signal representing a value of gain required to reduce the magnitude of the actual position difference signal; and (b) adding the gain modification signal to a base gain signal representing a base value of the gain of the selected servo mechanism to produce a modified gain signal.

6. Apparatus for controlling two servo mechanisms associated with driving means for effecting parallel motion of distal ends of a single rigid machine member, the motion being defined relative to a single axis of motion of the machine and being effected in response to a machine member motion command signal, each servo mechanism responding to a command signal, a gain signal and an actual position signal to produce a drive command signal for controlling the velocity of the associated driving means, the apparatus comprising:

(a) means for periodically producing the actual position signals representing the actual positions of the driving means relative to the axis of motion of the machine member;

(b) means for producing an actual position difference signal in response to the actual position signals of both servo mechanisms, the actual position difference signal representing the difference between the actual positions of the driving means; and (c) means responsive to the actual position difference signal for producing a modified gain signal representing a gain value of a selected servo mechanism required to reduce the magnitude of the actual position difference signal.

7. Apparatus for controlling two servo mechanisms, each servo mechanism associated with driving means for effecting parallel motion of distal ends of a single rigid machine member, the motion being defined relative to a single axis of motion of the machine and being effected in response to a machine member motion command signal, each servo mechanism responding to a command signal, a gain signal and an actual position signal to produce a drive command signal for controlling the velocity of the associated driving means, the apparatus comprising:

(a) means for effecting the production of drive command signals repetitively and successively for each servo mechanism;

(b) means for periodically producing actual position signals representing the actual positions of the driving means relative to the axis of motion of the machine member;

(c) means for producing an actual position difference signal in response to the actual position signals of both servo mechanisms, the actual position difference signal representing the difference of positions of the driving means; and (d) means responsive to the actual position difference signals for producing a modified gain signal, the modified gain signal being applied to a selected servo mechanism to reduce the magnitude of the actual position difference signals.

8. The apparatus of claim 7 wherein the means for producing the actual position difference signal further comprises:

(a) means for multiplying the command signal of the nonselected servo mechanism by a constant of proportionality;

(b) means for subtracting the product of multiplication from the actual position signal of the selected servo mechanism; and (c) means for subtracting the difference between the product of multiplication and the actual position signal from the actual position signal of the nonselected servo mechanism to produce the actual position difference signal.

9. The apparatus of claim 8 wherein the means for producing the modified gain signal further comprises:
(a) means responsive to the actual position difference signal for producing a gain modification signal representing a magnitude of gain necessary to reduce the magnitude of the actual position difference signal; and
(b) means for adding the gain modification signal to a base gain signal representing a base value of gain of the selected servo mechanism to produce a modified gain signal.

* * * * *